United States Patent [19]

Lindquist

[11] Patent Number: 4,612,861
[45] Date of Patent: Sep. 23, 1986

[54] DRIVERLESS TUGGER VEHICLE

[75] Inventor: Per E. Lindquist, Easton, Pa.

[73] Assignee: Si Handling Systems, Inc., Easton, Pa.

[21] Appl. No.: 559,123

[22] Filed: Dec. 7, 1983

[51] Int. Cl.$^4$ ............................................. B61B 13/12
[52] U.S. Cl. .................................... 104/166; 104/162; 198/746; 198/718
[58] Field of Search ............... 104/166, 169, 170, 162, 104/176; 254/35; 198/718, 746, 741, 738

[56] References Cited

U.S. PATENT DOCUMENTS

| 3,696,754 | 10/1972 | Anderson et al. | 104/162 |
| 3,861,322 | 1/1975 | Danly | 104/166 |
| 4,018,328 | 4/1977 | Galarowie et al. | 198/747 X |
| 4,252,064 | 2/1981 | Ratcliff, Jr. et al. | 104/162 |
| 4,378,741 | 4/1983 | Nagahori | 104/166 X |

FOREIGN PATENT DOCUMENTS

| 7836569 | 8/1980 | France | 104/162 |
| 2067964 | 8/1981 | United Kingdom | 104/166 |

Primary Examiner—David A. Scherbel
Assistant Examiner—Glenn B. Foster
Attorney, Agent, or Firm—Seidel, Gonda, Goldhammer & Abbott

[57] ABSTRACT

A driverless tugger vehicle adapted to contact another driverless vehicle and push or pull the latter to a source of power includes a body having support wheels for riding on tracks. The body has a drive wheel adapted for frictional contact with a drive shaft. A contact member on the body is provided for pushing or pulling the other driverless vehicle. A switch actuator is provided on the body for initiating reversal of direction of movement of the body when the contact member is coupled to said other driverless vehicle.

13 Claims, 3 Drawing Figures

DRIVERLESS TUGGER VEHICLE

BACKGROUND OF THE INVENTION

In some work stations such as a paint spray booth or kiln, work is moved through the work station while supported by a driverless vehicle. The driverless vehicle is propelled through the work station by contact between a tow pin and a pusher on the auxilary endless conveyor. After the driverless vehicle has traversed the work station, it comes to a halt along a pair of tacks.

The present invention is directed to a solution of the problem of how to provide a tugger vehicle for pushing or pulling the work loaded driverless vehicles to a powered section of tracks or a primary conveyor. The tugger vehicle must be driverless, must travel along its tracks until it makes contact with the work loaded driverless vehicle whose exact location is unknown, and must then reverse its direction of movement so as to push or pull the work loaded driverless vehicle away from the work station to a location wherein the vehicles separate with the tugger vehicle returning to retrieve another work supporting driverless vehicle whereby the system is automated.

SUMMARY OF THE INVENTION

The present invention is directed to a driverless tugger vehicle which is adapted to reciprocate to a position wherein it contacts another driverless vehicle and pushes or pulls the latter to a source of power. The tugger vehicle includes a body having support wheels for riding on tracks and a drive wheel adapted for frictional contact with a drive shaft parallel to the tracks. The tugger vehicle body has a contact means thereon for contact with the driverless vehicle to be pushed or pulled. A switch actuator is provided on the tugger vehicle body for initiating reversal of direction of movement of the tugger vehicle. The actuator is coupled to said contact means so as to activate a switch when the contact means is in a position to push or pull another driverless vehicle.

It is an object of the present invention to provide a novel driverless tugger vehicle adapted to solve the problem referred to above. Other objects and advantages will appear hereinafter.

For the purpose of illustrating the invention, there is shown in the drawings a form which is presently preferred; it being understood, however, that this invention is not limited to the precise arrangements and instrumentalities shown.

DETAILED DESCRIPTION

Figure 1:
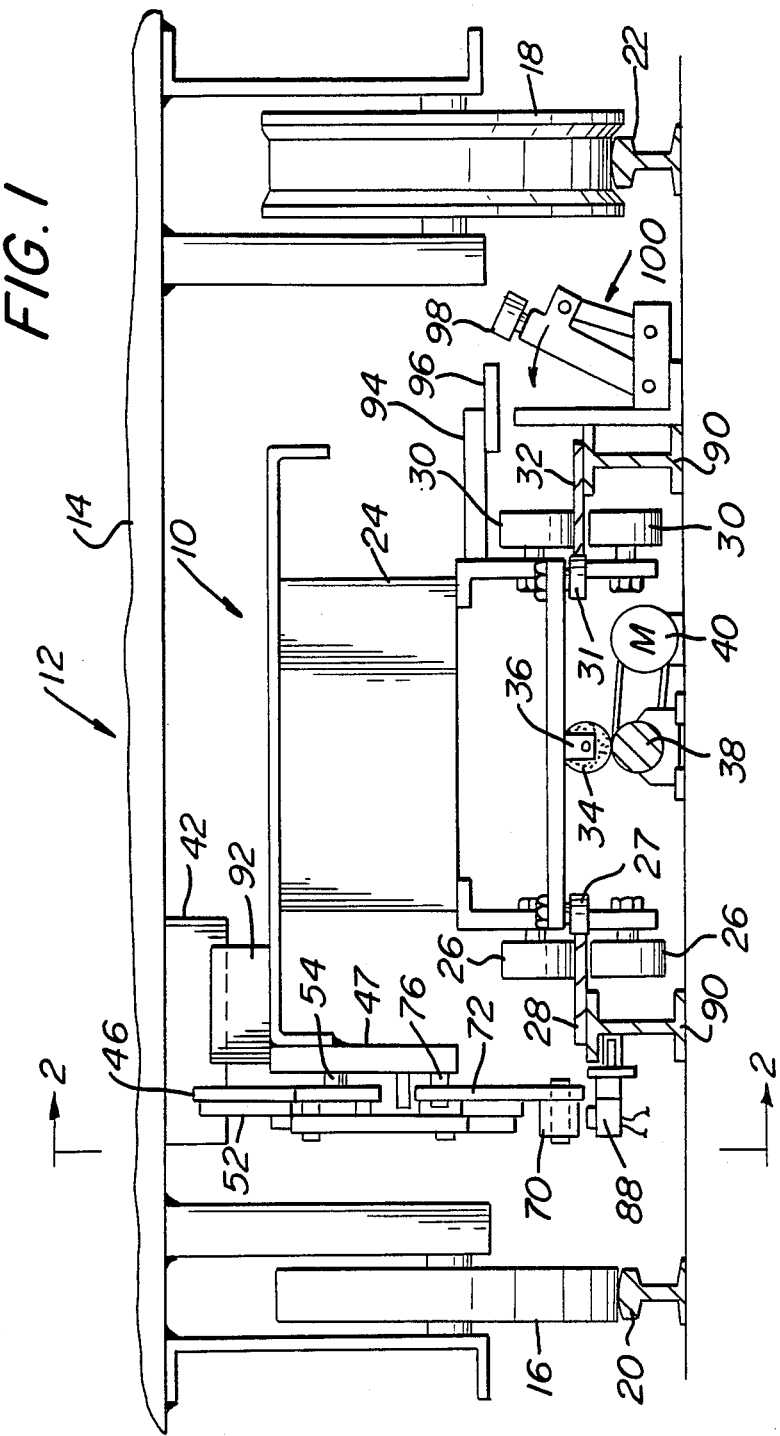
FIG. 1 is a sectional view showing a work loaded driverless vehicle being pulled by a tugger vehicle.

Referring to the drawing in detail, wherein like numerals indicate like elements, there is shown in FIG. 1 a driverless tugger vehicle designated generally as 10. The vehicle 10 is adapted to push or pull a work loaded driverless vehicle designated generally as 12. Vehicle 12 includes a body 14 having support wheels 16 and 18. The wheels 16 ride on rail 20. The wheels 18 ride on rail 22.

The tugger vehicle 10 is preferably sufficiently small in height so that at least a portion thereof may pass underneath the body 14. The tugger vehicle 10 includes a body 24 having support wheels 26 riding on opposite sides of track 28 and support wheels 30 riding on opposite sides of track 32. The body 24 includes wheels 27 which engage a side face of track 28 and wheels 31 which engage a side face of track 32. The wheels 26, 27, 30 and 31 make it impossible for the tugger vehicle 10 to tip over.

The tugger vehicle 10 has at least one drive wheel 34 in frictional engagement with a longitudinally extending drive shaft 38. Drive wheel 34 is supported for rotation about a horizontal axis by a support mount 36. Support mount 36 is spring biased for oscillation about a vertical axis to a drive position. Shaft 38 is rotatable in opposite directions by reversible motor 40.

The vehicle 12 has a lug 42 depending downwardly from the body 14. The tugger vehicle 12 has a contact means designated generally as 44 which is adapted to contact the lug 42 and facilitate the propelling of vehicle 12 by vehicle 10.

The contact means 44 includes a link 46 having a cam surface 48 and a pushing surface 50. See FIG. 3. A link 52 is pivoted to link 46 at pivot 54. Link 52 has a length sufficient so that it may project beyond the pushing surface 50. Pivot 54 is a stub shaft mounted on mounting plate 47. Hence, each of links 46 and 52 may oscillate about the horizontal axis of pivot 54 relative to the body 24 on the tugger vehicle 10.

A link 56 is connected at its upper end to link 52 at pivot 58. The lower end of link 56 is pivotably connected to one end of link 60 at pivot 62. The other end of link 60 is pivotably connected to one end of link 64 and pivot 66. The other end of link 64 is pivotably connected to the link 46. Links 56 and 64 are parallel and of the same length. Links 46 and 60 are parallel.

A switch actuator 70 is provided. Actuator 70 is of substantial length. As illustrated, actuator 70 has a length corresponding approximate to the length of the body 24 of the tugger vehicle 10. Switch actuator 70 is pivotably connected to one end of link 72 at pivot 74. The other end of link 72 is pivotably connected to plate 47 at pivot 76. Pivot 76 is a stub shaft attached to the plate 47. Actuator 70 is also pivotably connected to one end of link 78 at pivot 80. The other end of link 78 is pivotably connected to the plate 47 at pivot 82. Link 78 is also pivoted to link 60 at pivot 84.

Links 72 and 78 are of the same length. The distance between pivots 74 and 76 equals the distance between pivots 80 and 82. The distance between pivots 76, 82 corresponds to the distance between pivots 74 and 80. Thus, the switch actuator 70 is provided with a parallelogram support which in turn is coupled to a second parallelogram. The second parallelogram is defined by links 46, 52, 56, 60 and 64. The pivots 54, 76 and 82 are the only pivots mounted on the plate 47.

Figure 2:
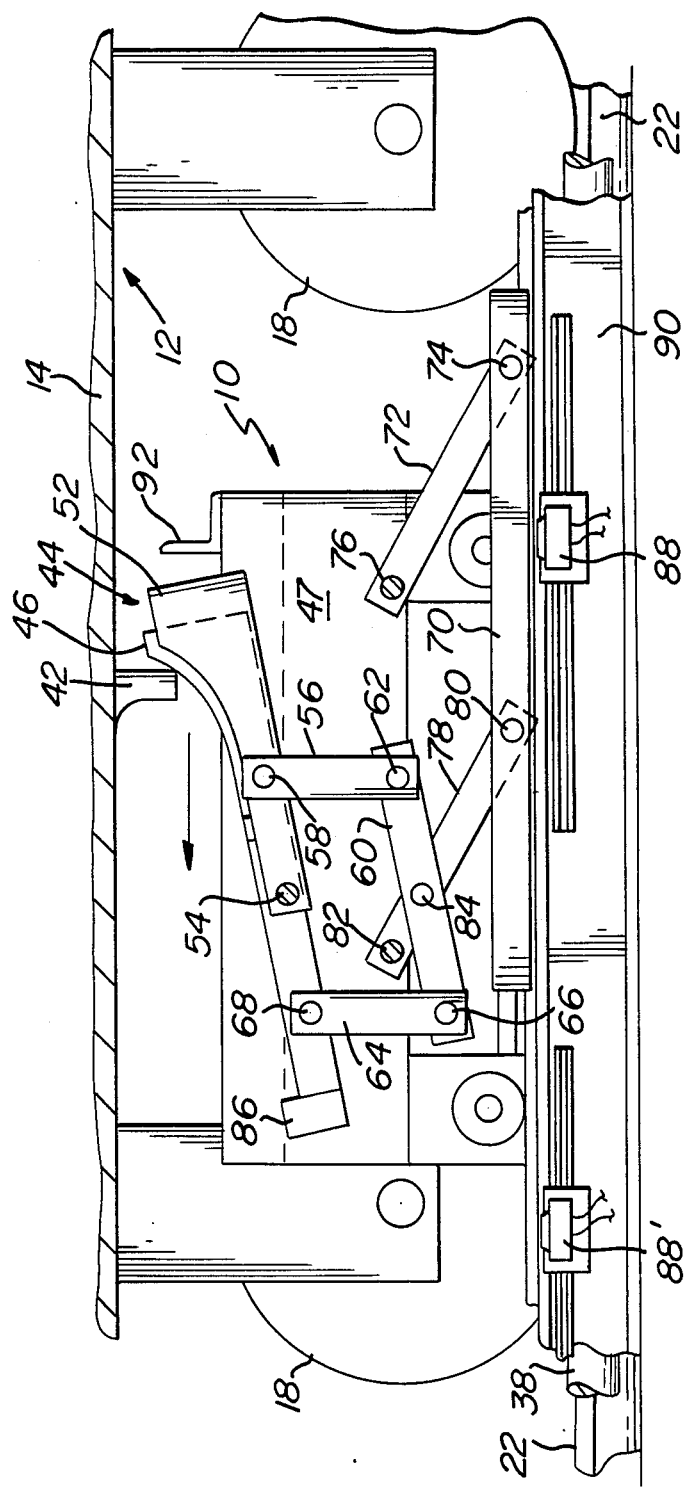
FIG. 2 is a sectional view taken along the line 2—2 in FIG. 1.

The link 46 and its associated parallelogram is biased to the position shown in FIG. 2 by way of a counter weight 86. If desired, such biasing could be attained by a spring. So long as links 46, 52 move together at the same time, switch actuator 70 will not change elevation. The actuator 70 will only change elevation if there is relative movement between links 46 and 52.

The change in elevation of actuator 70 is utilized to trigger a switch. If desired, a photocell can be provided along the rails to detect a change in elevation of actuator 70. As illustrated, a proximity switch 88 is provided on the rail 90 and tripped by the actuator 70. Since the exact location of vehicle 12 is unknown to vehicle 10, a plurality of switches 88 are provided on the rail 90 with the spacing being less than the length of actuator 70. Each switch 88 is coupled to motor 40 to cause the motor 40 to reverse in direction. The body 24 of the tugger vehicle 10 is preferably provided with a lug 92 to prevent the tugger vehicle from overshooting the lug 44 on the vehicle 12.

At one or more locations along rails 90, such as the locations where coupling and uncoupling of vehicles 10, 12 occurs, a speed control device may be provided. As shown in FIG. 1, arm 94 is attached to the mount 36 for drive wheel 34. Arm 94 supports cam 96. Cam 96 is adapted to cooperate with cam follower 98 to change the angular disposition of drive wheel 34 relative to drive shaft 38 to slow down the vehicle 10. Cam follower 98 is mounted on a mechanism 100 shown in an inoperative position. Mechanism 100 includes a drive such as a power cylinder, for moving cam follower in the direction of the arrow so that cam follower 98 may contact cam 96 when and where speed control is desired.

DESCRIPTION OF OPERATION

After passing through a work station, the vehicle 12 will come to a half along the rails 20, 22 in a predetermined area such as a zone up to 600 cm long. It is desired to have the tugger vehicle 10 retrieve the vehicle 12 and move it to a powered spur. Insofar as the vehicle 10 is concerned it does not know the exact location of vehicle 12 within the predetermined zone.

Figure 3:
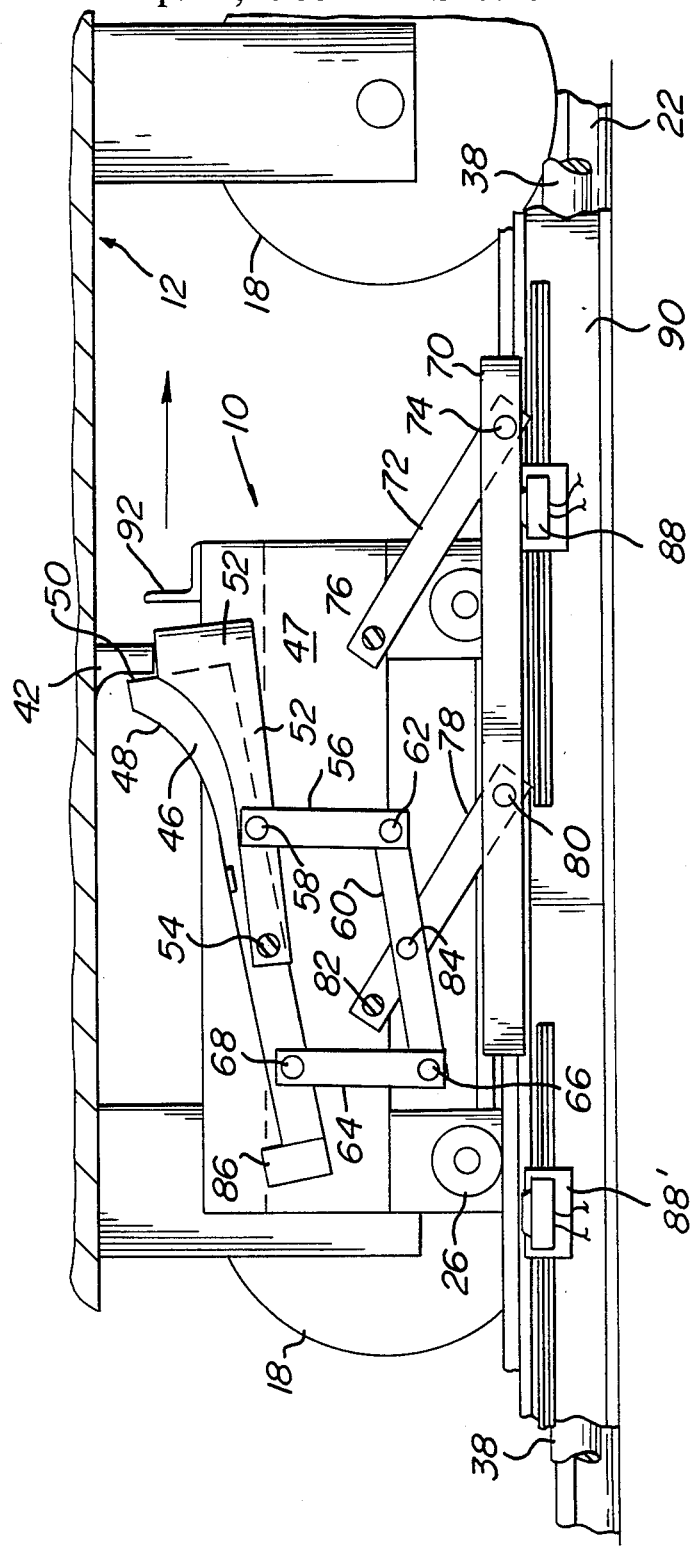
FIG. 3 is a view similar to FIG. 2 but showing a switch actuator in its operative position.

The vehicle 10 is propelled along its tracks 28, 32 by frictional contact between drive wheel 34 and drive shaft 38. As the vehicle 10 passes beneath the vehicle 12, lug 42 will contact cam surface 48 on link 46 and pivot the same about pivot 54. As soon as link 46 passes lug 42, it will be returned to the pushing position as shown in FIG. 3 by counterweight 86 while the upper surface on link 52 will engage the bottom surface on lug 42. If the vehicle 10 overshoots the lug 42, lug 92 will contact lug 42 and act as a limit stop. Since the links 46 and 52 did not pivot the same amount, switch actuator 70 will descend while remaining horizontal and trigger switch 88.

Actuator 70 may trigger switch 88 by direct contact therewith or due to the distance therebetween if switch 88 is a proximity switch. As soon as one of the switches 88 is triggered by actuator 70, the motor 40 will reverse itself and thereby cause the shaft 38 to be rotated in an opposite direction. Due to frictional contact between shaft 38 and drive wheel 34, the tugger vehicle 10 will propel the vehicle 12 from left to right in FIGS. 2 and 3 until the vehicle 12 looses contact with lug 42.

When the vehicles 10 and 12 arrive at a powered spur for the vehicle 12, they may be separated in any convenient matter. A simple way of separating the vehicles is cause the adjacent portion of tracks 28 and 32 to be angled slightly downwardly so that the momentum of vehicle 12 will cause lug 42 to clear lug 92. At the same time the lowering of the tracks will lower the elevation of switch actuator 70 so that it trips a switch which will again reverse the direction of motor 40 and cause the tugger vehicle 10 to return and retrieve another vehicle comparable to vehicle 12. Thus, the tugger vehicle will shuttle back and forth and retrieve a vehicle 12 each time it moves in one direction.

Thus, it will be apparent that tugger vehicle 10 is a driverless vehicle capable of reciprocating along a predetermined length of track for retrieving another driverless vehicle whose precise location along the track is unknown other than the fact that it is located within a predetermined zone up to about 600 cm long.

The present invention may be embodied in other specific forms without departing from the spirit or essential attributes thereof and, accordingly, reference should be made to the appended claims, rather than to the foregoing specification, as indicating the scope of the invention.

I claim:

1. A driverless tugger vehicle adapted to shuttle back and forth on a first path and pull another driverless vehicle supported for movement along a second path parallel to said first path each time it moves in a forward direction, said tugger vehicle including a body having support wheels, at least one drive wheel on said tugger vehicle, said drive wheel being adapted for frictional contact with a drive shaft separate from the tugger vehicle and positioned adjacent to the first path for propelling the tugger vehicle, contact means on the tugger vehicle adapted for selective engagement with another vehicle to propel the other vehicle along said second path when said tugger vehicle moves in a forward direction, a switch actuator supported by said body, said actuator being coupled to said contact means so as to activate a switch means to effectuate a reversal of the direction of travel of the tugger vehicle when said contact means engages another vehicle to be propelled by the tugger vehicle.

2. A vehicle in accordance with claim 1 wherein said contact means is one link of a parallelogram and mounted for pivotable movement about a horizontal axis on said body.

3. A vehicle in accordance with claim 2 wherein said contact means includes a second link substantially parallel to and adjacent to said first link, one end of said second link projecting beyond an adjacent end of said first link, and means for causing said actuator to remain horizontal except when said first and second links pivot together and through the same distance.

4. A vehicle in accordance with claim 1 wherein said contact means is part of a first parallelogram linkage, said switch actuator being part of a second parallelogram linkage, said linkages being coupled together.

5. A vehicle in accordance with claim 1 wherein said switch actuator is an elongated member having a length approximately equal to the length of said body of said tugger vehicle.

6. An automated system comprising a driverless tugger vehicle adapted to shuttle back and forth along a first set of tracks, said tugger vehicle including a body having support wheels and a rolling contact with said first tracks, at least one drive wheel on said tugger vehicle, said drive wheel adapted to be in frictional contact with a drive shaft, a motor for rotating said drive shaft seperate from the tugger vehicle and positioned adjacent to the first path for propelling the tugger vehicle about it longitudinal axis, a second pair of tracks parallel to said first pair of tracks, contact means of the tugger vehicle for selective engagement with another vehicle to propel the other vehicle along said second tracks when the tugger vehicle moves in a forward direction, said tugger vehicle having a switch actuator, at least one switch means along said first tracks for actuation by said actuator to effectuate a reversal of the direction of travel of the tugger vehicle, and means coupling said switch actutator to said contact means so that said switch means is activated when said contact means engages another driverless vehicle on said second tracks.

7. A system in accordance with claim 6 wherein said contact means is one link of a parallelogram and mounted for pivotable movement about a horizontal axis on said body.

8. A system in accordance with claim 6 wherein said contact means is part of a first parallelogram linkage, said switch actuator being part of a second parallelogram linkage, said linkages being coupled together.

9. A system in accordance with claim 6 wherein said switch actuator is an elongated member having a length approximately equal to the length of said body of said tugger vehicle.

10. A system in accordance with claim 6 wherein at least a portion of said tugger vehicle can pass beneath said other driverless vehicle which is disposed on said second tracks, said contact means being on said portion and projecting generally upwardly.

11. An automated system comprising a driverless tugger vehicle adapted to shuttle back and forth along a first set of tracks, said tugger vehicle including a body having support wheels in rolling contact with said first tracks, at least one drive wheel on said tugger vehicle, said drive wheel adapted to be in frictional contact with a drive shaft, a motor for rotating said drive shaft separate from the tugger vehicle and positioned adjacent to the first path for propelling the tugger vehicle about its longitudinal axis, a second pair of tracks parallel to said first set of tracks, contact means on the tugger vehicle for selective engagement with another vehicle to propel the other vehicle along said second tracks when the tugger vehicle moves in a forward direction, said contact means being one length of a parallelogram and mounted for pivotable movement about a horizontal axis on said body, said tugger vehicle having a switch actuator, at least one switch along said first tracks for actuation by said actuator to effectuate a reversal of the direction of travel of the tugger vehicle, and means coupling said switch actuator to said contact means so that said switch is activated when said contact means engages another driverless vehicle on said second tracks, said switch being coupled to said motor and adapted to reverse the direction of rotation in which the drive shaft is rotated by said motor, at least a portion of said tugger vehicle can pass beneath said other driverless vehicle which is disposed on said second tracks, said contact means being on said portion and projecting upwardly for contact with mating structure on said other vehicle.

12. A system in accordance with claim 11 wherein said contact means is part of a first parallelogram linkage, said switch actuator being part of a second parallelogram linkage, said linkages being coupled together.

13. A system in accordance with claim 11 wherein said switch actuator is an elongated member having a length approximately equal to the length of said body of said tugger vehicle.

* * * * *

UNITED STATES PATENT AND TRADEMARK OFFICE
CERTIFICATE OF CORRECTION

PATENT NO. : 4612861
DATED : September 23, 1986
INVENTOR(S) : Per E. Lindquist

It is certified that error appears in the above—identified patent and that said Letters Patent is hereby corrected as shown below:

On the title page, Item [73]

delete "Si Handling Systems, Inc., Easton, Pa.".

insert --SI Handling Systems, Inc., Easton, Pa.--.

Signed and Sealed this

Sixteenth Day of December, 1986

Attest:

DONALD J. QUIGG

Attesting Officer

Commissioner of Patents and Trademarks